Sept. 12, 1967     M. S. ROSEN     3,341,468
APPARATUS FOR PRODUCING HOT LATHER
Filed Sept. 28, 1965     3 Sheets-Sheet 1

INVENTOR.
MEL S. ROSEN
BY JOHN P. CHANDLER
HIS ATTORNEY.

Sept. 12, 1967　　　　　M. S. ROSEN　　　　　3,341,468
APPARATUS FOR PRODUCING HOT LATHER
Filed Sept. 28, 1965　　　　　　　　　　　3 Sheets-Sheet 2
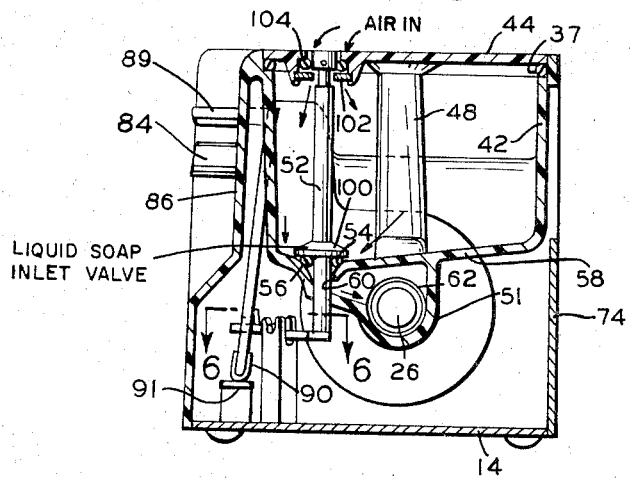
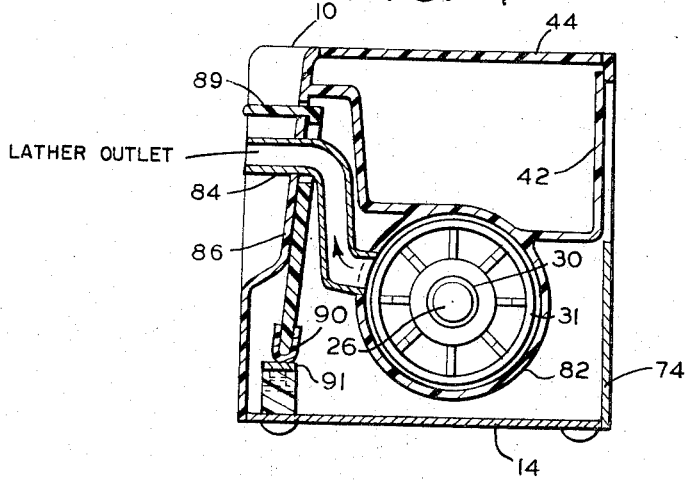
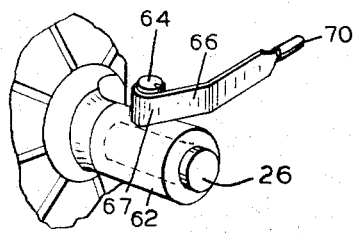
INVENTOR.
MEL S. ROSEN
BY
JOHN P. CHANDLER
HIS ATTORNEY.

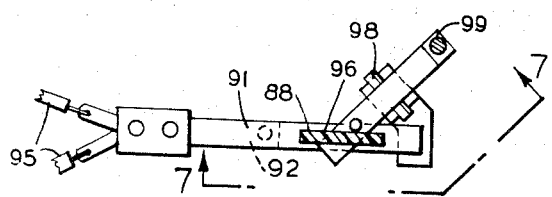
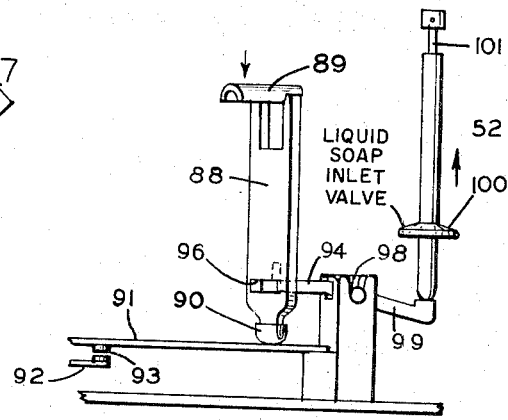
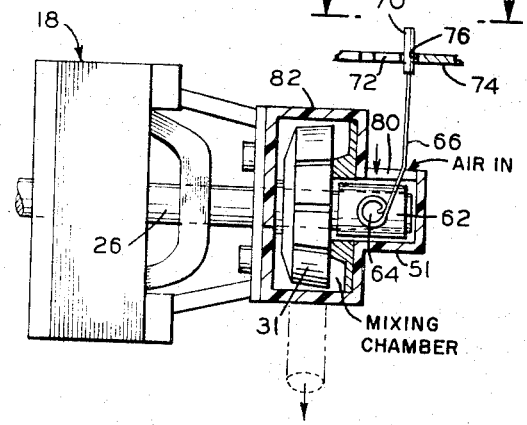
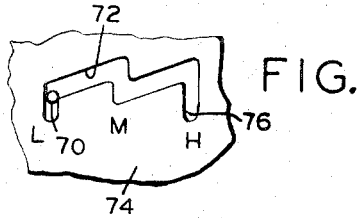
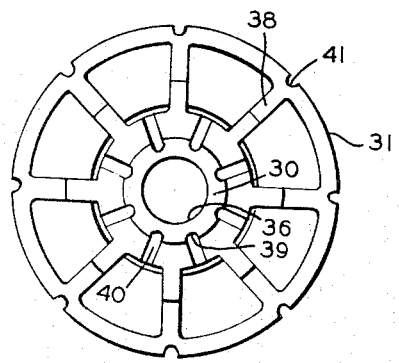
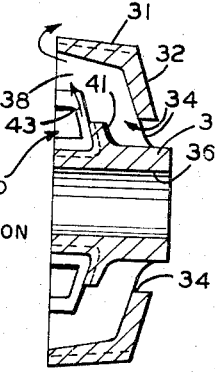
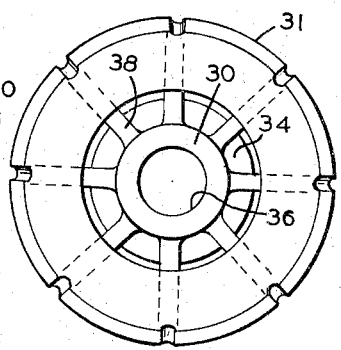
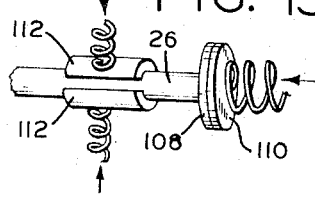

3,341,468
APPARATUS FOR PRODUCING HOT LATHER
Mel S. Rosen, 148—44 61st Road,
Flushing, N.Y. 11367
Filed Sept. 28, 1965, Ser. No. 490,976
11 Claims. (Cl. 252—359)

ABSTRACT OF THE DISCLOSURE

Hot lather mixer wherein an apertured impeller mounted on a driven shaft circulates lather outwardly due to centrifugal force and inwardly due to low pressure area at one end of the impeller and such recirculation continues for a number of passes of the lather through the machine which is also fitted with a friction heating element mounted on the shaft.

This invention relates to a machine for making hot lather and adapted primarily for home use and it relates more particularly to an apparatus for instantly producing hot lather in any desired quantity by the simple act of closing an electrical switch.

An important object of the invention is to provide an improved whipping device for incorporating minute air particles in a liquid soap preparation, to form a foam or emulsion and wherein the entire quantity of saponaceous liquid fed to a beater or spinner is instantly delivered as a warm lather.

Another object of the invention is to provide an improved heating device for the substance, using a particular type of bearing which imparts pressure to the shaft resulting in the development of instant heat to produce the hot lather without preheating the fluid soap solution.

There are a number of devices for producing hot lather for shaving purposes but for the most part these machines produce a wet, "sudsy" lather which not only feels unpleasant on the face but actually fails to soften the beard. It is apparently necessary to incorporate a myriad of tiny air bubbles into the lather in order to cause it to support the whiskers to best advantage during the shaving operation as well as to soften them by providing the maximum wetting action.

Rather than to convert the usual wet thin lathery solution, usually produced, into a lather having a proper consistency of tiny air bubbles, it is an object of the present invention to prepare the desired lather in the first instance by recycling the material several times through the whipping apparatus and to restrict the size of the outlet conduit so that the lather must be recycled several times before it is permitted to emerge and be collected upon the hand of the user.

The foamy product may also be used for washing the hands.

In the drawings:

FIG. 3 is a section taken on line 3—3 of FIG. 2;

FIG. 4 is a section taken on line 4—4 of FIG. 2;

FIG. 5 is a perspective view of the heating means for the lather;

FIG. 6 is a section taken on line 6—6 of FIG. 3;

FIG. 7 is a section taken on line 7—7 of FIG. 6;

FIG. 8 is a broken horizontal section through the impeller;

FIG. 9 is a broken section taken on line 9—9 of FIG. 8;

FIG. 10 is a front elevation of the impeller;

FIG. 11 is a central section through the impeller;

FIG. 12 is a rear elevation of the impeller; and

FIG. 13 is a perspective view of the shaft and showing alternative means for producing heat through frictional engagement between stationary and moving surfaces.

Figure 1:
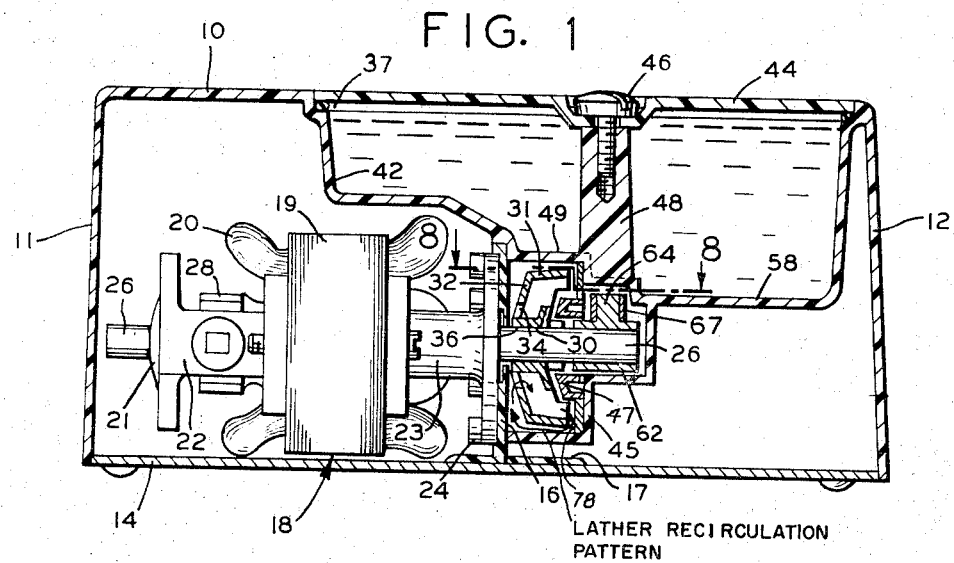
FIG. 1 is a central section taken through the apparatus of the present invention.
Figure 2:
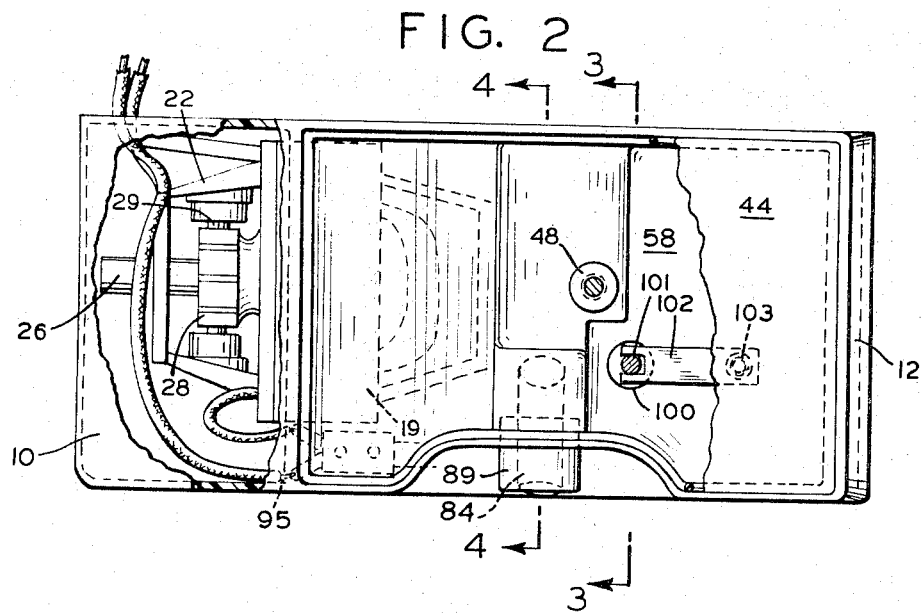
FIG. 2 is a plan view thereof with portions of the upper wall removed to show internal parts.

The moving parts of the apparatus are enclosed within a housing shown in FIGS. 1 to 4 having a top wall 10, side walls 11 and 12 and a removable bottom wall or closure 14. A vertical mounting plate 16 (FIG. 1) has a base support 17 secured on the bottom wall about half way between the two opposed side walls, 11–12. A motor 18 is mounted on the left side of the plate and it includes a laminated field 19 with field windings 20, bearings 21 supported in bearing frames 22 and 23, the latter frame being secured to the mounting plate by bolts 24.

A shaft 26 carrying the armature (not shown) is journalled in the bearing frames and it carries a commutator 28 engaged by brushes 29. At one end the motor shaft carries a rotor comprising a centrifugal impeller of special design fast thereon and including a hub 30 (FIG. 1) and an impeller shroud 31 with a conical portion 32 at one end thereof and having openings 34 through which the liquid soap mixture passes to the interior of the impeller adjacent its axis.

The impeller further has an axial opening 36 to receive shaft 26 and radial blades or vanes 38 extending outwardly from the hub and which support the shroud. This arrangement imparts a centrifugal action on the liquid soap mixture which enters the air-soap mixing zone at the axis. The outer periphery of the hub has longitudinal recesses 39 which lead to radial recesses 40 located between the vanes 38 and the outer periphery of the impeller also has recesses 41 to aid in the incorporation of air bubbles in the liquid soap mixture.

It will be noted that the shroud 31 of the impeller extends beyond internal vanes and that the vanes 38 are cut away at 34 (FIG. 11) to provide additional pathways for the soap mixture. The outer wall 45 of housing 51 has baffles 47 (FIG. 1) which extend into the interior of the impeller and, of course, are fixed so that during rotation of the rotor additional opportunity is afforded for the whipping action which incorporates the fine air bubbles into the soap mass.

The fluid soap mixture is carried in a reservoir or tank 42 (FIG. 1) supported in part by top wall 10 and side wall 12 and the reservoir is closed by a cover plate 44 secured in place by a screw 46 passing into a fixed post 48 which may be formed integrally with bottom walls 49 and 58 of the reservoir. If desired a sealing gasket 37 may be positioned under the rim of the cover.

The liquid soap is fed from the reservoir to a sump or housing 51 (FIGS. 1 and 4) surrounding shaft 26 by the opening of a valve member 52 which carries an O-ring 54 fitting within a valve seat 56 at the lowest part of the reservoir defined by an inclined wall 58, the seat being aligned with valve opening 60.

The section of the shaft 26 located within a housing or sump 51 where the liquid soap mixture enters carries the frictional heating means comprising a bushing 62 (FIG. 5) having a bore closely fitting the shaft but permitting rotation therein. This bushing turns from its position parallel with the shaft to a position slightly non-parallel therewith, and exerting frictional pressure thereon, by means of a boss 64 extending upwardly from the bushing and carrying a flat bimetallic spring 66 having an inner section 67 coiled around the boss and keyed thereto. This twisting moment applied to the bushing on the shaft causes friction and heat. Spring 66 is a bimetallic heat sensitive element which will "relax" by increasing its curvature when subjected to heat. In this fashion a more constant heat can be generated by automatic regulation of the pressure created on shaft 26. Alternately, a substitute spring may be used that will be fairly constant in torque. It can be made from spring wire or the like and be wound around the bearing 62 with an arm extending out to plate 74 adjustable as in FIG. 9.

It will be seen that as the narrowed finger portion 70 is moved to the left in FIG. 5 greater resistance to rotation is afforded to the shaft and as the fluid mixture drops on the heated bushing, it is rapidly heated. This free end of the spring passes through an irregularly or zig-zagged shaped slot 72 in a rear wall 74 of the housing (FIG. 9), the slot having vertical abutments 76 to catch the spring in one of three positions having marks indicating low, medium or high degrees of heat. It will be noted in FIG. 8 that sump 51 also has an opening 80 for the spring to pass through. Opening 80 also provides air for intake into the impeller with soap solution.

The sump 51 has an enlarged housing portion 82 (FIG. 4) closely surrounding the rotating impeller and mounted in this housing is a fixed plate 78 carrying a baffle 47 which extends into annular recess 43 in the impeller. The plate and the baffle may, if desired, be formed in one piece rather than the two piece construction shown. Housing 82 has an outlet conduit 84 for the lather generated in the mixing zone, said conduit passing through a front wall of the main housing and having a recess 86 so that the discharge end of the conduit is flush with the front wall but is accessible to the fingers of the user which receives the lather.

Operation of the valve 52 and the motor 18 is controlled by a manual lever 88 (FIG. 7) having a finger piece 89 located in the front wall recess just above outlet conduit 84. An insulating cap 90 at the lower end of the lever engages a movable contact lever 91 and urges it against a fixed contact lever 92, both contact levers having electrical contacts 93 to operate the motor so long as lever 88 is depressed. Wires 95 from the switch are connected with the motor. One arm 94 of a bell crank lever passes through an opening 96 in lever 88, the bell crank being centrally pivoted at 98 and the other end of the lever 99 thereof engages the lower end of the valve.

This valve carries a flange 100 which urges against the O ring 54 in closing the valve. At its upper end, the valve has a reduced section 101 forming a shoulder to allow air into the tank when the valve is lifted past O ring 104. Spring 102 rests on top of valve 100 and is secured at 103 to bottom wall 58.

The operation of the apparatus will be largely clear from the foregoing description. When finger piece 89 (FIG. 7) is depressed the motor circuit is closed and the valve 52 is opened allowing fluid soap to pass into sump 51 in contact with bushing 62 which has become heated due to the friction. The whirling impeller picks up the heated soap solution, and the vanes 38 hurl it outwardly by centrifugal action against the wall of annular housing 82, and the recesses 39 and 40, and radial vanes 38 have a chopping action on the liquid soap, tending to break it up or incorporate air bubbles therein.

It will be noted that the cross-sectional area of delivery conduit 84 (FIG. 4) is rather small so that only a small portion of the lather may issue from the free end of the conduit. This fact causes the excess of lather to seek its only other outlet which is the passageway leading inwardly towards the axis between fixed wall 16 and conical wall 32 of the rotor.

The flowing lather is sucked into the holes 34 in this latter wall, thus beginning the recirculation of the lather for its second pass through the maze.

It will be apparent from the foregoing that the lather issuing a second or two after operation starts has a finer texture than that which issues at the very beginning although a small handful of the lather, sufficient to cover the entire face, rapidly mixes during application. Thus, the overall texture is a fine lather which gives the best result for either shaving or other cleaning applications.

The heating means earlier described consists in applying torque to bushing 62 in a direction non-parallel with shaft 26. Alternative means wherein the heat is obtained through friction resulting from pressure of a fixed surface against a rotating surface is shown in FIG. 13 wherein the shaft 26 has a flat or conical disc 108 secured at its end and its face is engaged by a non-rotating disc 110 mounted in the frame urged against it by spring pressure. The second disc will have a surface contour shaped to fit the rotating disc.

The half-cylindrical shoes 112 are also spring urged against the shaft and one or both of these arrangements gives a desired amount of heat for the soap solution.

What I claim is:

1. An apparatus for producing hot lather and including a frame, a motor with a shaft mounted on the frame, an impeller with radial blades fast on the shaft, a bushing freely carried on the shaft and means for imparting a twisting moment to the bushing in a direction non-parallel with the shaft to create friction and heat between the bushing and the shaft, a reservoir for soap solution above the impeller, a housing closely surrounding the impeller and bushing, means for feeding liquid soap and air into said housing near the axis of the bushing and impeller to heat the same and impart kinetic action to the soap centrifugally outwardly against the housing and feed it back to said axis for recirculation to incorporate fine air bubbles therein, a valve controlling feed of the liquid, a manual control for the motor and said valve, and a relatively small discharge conduit for the lather so as to cause it to recirculate a number of times before it can move out through said discharge opening.

2. An apparatus for producing hot lather from liquid soap and including a frame, a motor with a shaft mounted on the frame, an impeller fast on the shaft and having a peripheral annular wall, axial radial walls, and a transverse wall joined to the peripheral wall at their peripheral edges, said radial walls and transverse wall defining holes near the shaft axis, a member adjacent the impeller and engaging the shaft during rotation thereof, and means urging said member against the shaft with sufficient pressure to create heat by friction and thus heat the liquid soap, a housing closely surrounding the impeller and member, said housing also having an air inlet opening, means for feeding liquid soap into said housing near the axis of the impeller to impart kinetic action to the liquid soap centrifugally outwardly against the housing and then feed it back to said axis where it is sucked in said openings for recirculation through the housing to incorporate fine air bubbles therein whereby a substantial portion of the lather so formed is recirculated several times before it moves out of the housing, and a relatively small discharge conduit for the lather.

3. The structure recited in claim 2 wherein the liquid soap is contained in a reservoir secured to the frame above the housing.

4. The structure recited in claim 2 wherein the shaft has a disc fast thereon and said member is a second disc supported in non-rotative relation in the frame and is spring urged against the first disc to create heat as a result of said friction.

5. The structure recited in claim 2 wherein said member is a shoe which is spring urged against the shaft and contacts the outer periphery of the shaft over a sufficient area to creat said heat by friction.

6. The structure recited in claim 2 wherein the member engaging the shaft is a bushing freely mounted on the shaft within the housing, and the urging means is a means for imparting a twisting moment to the bushing so as to create said friction and heat.

7. The structure recited in claim 6 wherein the means for imparting the twisting moment is a bimetallic handle which bends and thus relaxes the twisting action as the amount of heat increases.

8. The structure recited in claim 6, including a handle wherein the twisting moment is produced by the handle which is movable to a plurality of fixed positions.

9. The structure recited in claim 2 wherein a manually movable valve is employed for controlling feed of the liquid soap and a switch for controlling the motor.

10. The structure recited in claim 9 wherein a single lever controls operation of the valve and switch.

11. An apparatus for producing hot lather for shaving purposes and including a housing, a shaft and an impeller with axial radial blades and journalled in the housing fast on the shaft, a bushing freely carried on the shaft, and means for applying a twisting moment to the bushing to create heat by friction, means for rotating the shaft, a housing around the impeller and bushing, and having an air inlet opening therein, means for feeding liquid soap into said housing near the axis of the bushing and impeller to heat the same and impart kinetic action to said liquid soap centrifugally outwardly against the housing, the housing confining said liquid soap and feeding it back to said axis for recirculation, thus incorporating fine air bubbles therein, and a relatively small discharge conduit for the lather, whereby a substantial portion of it must recirculate a number of times before it can move out through said discharge conduit.

References Cited

UNITED STATES PATENTS

| | | | |
|---|---|---|---|
| 1,374,446 | 4/1921 | Greenawalt | 261—93 X |
| 2,105,264 | 1/1938 | Reed. | |
| 2,301,851 | 11/1942 | Boerger | 252—359.5 X |
| 2,451,083 | 10/1948 | Haines. | |
| 3,215,642 | 11/1965 | Levy | 252—359.5 |

NORMAN YUDKOFF, *Primary Examiner.*

J. SOFER, *Assistant Examiner.*